(12) United States Patent
Su et al.

(10) Patent No.: US 11,791,560 B2
(45) Date of Patent: Oct. 17, 2023

(54) ELECTROMAGNETIC SCATTERING FILM AND ELECTRONIC DEVICE WITH ELECTROMAGNETIC SCATTERING FILM

(71) Applicant: GUANGZHOU FANGBANG ELECTRONICS CO., LTD, Guangzhou (CN)

(72) Inventors: Zhi Su, Guangzhou (CN); Qiang Gao, Guangzhou (CN)

(73) Assignee: GUANGZHOU FANGBANG ELECTRONICS CO., LTD, Guangzhou (CN)

( * ) Notice: Subject to any disclaimer, the term of this patent is extended or adjusted under 35 U.S.C. 154(b) by 85 days.

(21) Appl. No.: 17/615,227

(22) PCT Filed: Dec. 17, 2019

(86) PCT No.: PCT/CN2019/125928
§ 371 (c)(1),
(2) Date: Nov. 30, 2021

(87) PCT Pub. No.: WO2020/244190
PCT Pub. Date: Dec. 10, 2020

(65) Prior Publication Data
US 2022/0231422 A1    Jul. 21, 2022

(30) Foreign Application Priority Data

Jun. 5, 2019   (CN) .......................... 201910489146.X
Jun. 5, 2019   (CN) .......................... 201920847012.6
Sep. 20, 2019  (CN) .......................... 201910892056.5

(51) Int. Cl.
*H01Q 15/02* (2006.01)

(52) U.S. Cl.
CPC ................................. *H01Q 15/02* (2013.01)

(58) Field of Classification Search
CPC ........ H01Q 15/02; H01Q 15/04; H01Q 15/10; G03B 3/00
(Continued)

(56) References Cited

U.S. PATENT DOCUMENTS

| 3,633,206 A | * | 1/1972 | McMillan | .......... H01Q 15/0026 343/781 R |
| 2010/0220377 A1 | | 9/2010 | Yamada et al. | |
| 2018/0287262 A1 | * | 10/2018 | Patri | ...................... H01Q 13/02 |

FOREIGN PATENT DOCUMENTS

| CN | 1975467 A | * | 6/2007 |
| CN | 1975467 A | | 6/2007 |

(Continued)

OTHER PUBLICATIONS

J R Suckling et al 2007 New J. Phys. 9 101 (Year: 2007).*
(Continued)

*Primary Examiner* — Dimary S Lopez Cruz
*Assistant Examiner* — Brandon Sean Woods
(74) *Attorney, Agent, or Firm* — FLENER IP & BUSINESS LAW; Zareefa B. Flener

(57) ABSTRACT

An electromagnetic scattering film, and an electronic device with the electromagnetic scattering film are provided. The electromagnetic scattering film includes a metal layer, wherein the metal layer is provided with a through hole penetrating through an upper surface and a lower surface of the metal layer, and a maximum value of the distance s between any two points on a contour of a section of the through hole is less than the wavelength λ of a microwave emitted into the through hole, such that the microwave is diffracted after being emitted into the through hole. By arranging, on the metal layer, a through hole being smaller than the wavelength of a microwave, the microwave, which was originally transmitted in a linear manner, is diffracted (Continued)

after being emitted into the through hole, thereby expanding a microwave transmission and/or receiving space range.

15 Claims, 6 Drawing Sheets

(58) Field of Classification Search
USPC .......................................................... 343/753
See application file for complete search history.

(56) References Cited

FOREIGN PATENT DOCUMENTS

| | | |
|---|---|---|
| CN | 101470346 A | 7/2009 |
| CN | 108258406 A | 7/2018 |
| JP | S6237421 U | 3/1987 |
| KR | 20140060490 A | 5/2014 |
| KR | 20190059203 A | 5/2019 |

OTHER PUBLICATIONS

Beruete M, Sorolla M, Campillo I, Dolado JS, Martín-Moreno L, Bravo-Abad J, García-Vidal FJ. Enhanced millimeter-wave transmission through subwavelength hole arrays. Opt Lett. Nov. 1, 2004;29(21):2500-2. doi: 10.1364/ol.29.002500. PMID: 15584274 (Year: 2004).*

International Search Report, International application No. PCT/CN2019/125928, Date of mailing of the International Search Report, dated Mar. 18, 2020.

Japan Patent Office: First Office Action for JP2021-571624, action published Jan. 31, 2021. No translation available.

Korean Patent Office: First Office Action for KR10-2021-7041654, submitted Mar. 25, 2023. No translation available.

* cited by examiner

ELECTROMAGNETIC SCATTERING FILM AND ELECTRONIC DEVICE WITH ELECTROMAGNETIC SCATTERING FILM

CROSS-REFERENCE TO RELATED APPLICATIONS

This application claims the following three priorities to Chinese Patent Applications: 1. Application No. 201920847012.6, filed on Jun. 5, 2019; 2. Application No. 201910489146.X, filed on Jun. 5, 2019; and 3. Application No. 201910892056.5, filed on Sep. 20, 2019, the disclosures of which are hereby incorporated by reference in their entirety.

TECHNICAL FIELD

The present disclosure relates to a technical field of communication, for example, to an electromagnetic scattering film, and an electronic device with the electromagnetic scattering film.

BACKGROUND

Microwave communication refers to a communication performed by using an electromagnetic wave with a wavelength being in a range of 0.1 mm to 1 m. A frequency range corresponding to the electromagnetic wave in above wavelength band is 300 MHz (0.3 GHz) to 3 THz. Since a microwave has a characteristic of linear transmission, the microwave communication has a directing property. When a user is not in a specified direction region, a signal cannot be received, resulting in a communication blind district.

SUMMARY

The present disclosure is intended to provide an electromagnetic scattering film. A microwave is diffracted after penetrating a through hole in the electromagnetic scattering film, so as to expand a microwave transmission and/or receiving space range, thereby avoiding communication blind districts as much as possible.

The present disclosure is intended to further provide an electronic device. The device has a large microwave signal transmission and/or receiving range, so that the user may have good usage experience.

In order to realize the above objectives, the following technical solutions are provided.

On one aspect, an electromagnetic scattering film is provided, and includes a metal layer. The metal layer is provided with a through hole penetrating through an upper surface and a lower surface of the metal layer. A maximum value of a distance s between any two points on a contour of a section of the through hole is less than a wavelength λ of a microwave emitted into the through hole, such that the microwave is diffracted after being emitted into the through hole. By means of arranging, on the metal layer, the through hole being smaller than the wavelength of a microwave, the microwave, which is originally transmitted in a linear manner, is diffracted after being emitted into the through hole, thereby expanding a microwave transmission and/or receiving space range.

On the other aspect, an electronic device is provided. The electronic device includes the electromagnetic scattering film and a circuit device. The circuit device includes a signal circuit. The electromagnetic scattering film is connected with the circuit device.

In the electronic device provided by embodiments of the present disclosure, the electromagnetic scattering film is connected with the circuit device. A microwave signal, emitted and/or received by the signal circuit, is diffracted by using the through hole of the electromagnetic scattering film, thereby expanding a microwave signal transmission and/or receiving space range of the electronic device. In this way, a signal blind zone of the electronic device is avoided, and the usage experience of a user is improved.

REFERENCE NUMERALS

1: Metal layer; 11: Through hole; 111: Section; 1111: Point; 2: Insulation layer; 3: Conductive protrusion; 4: Adhesive film layer; 5: Protruding portion; 100: Electromagnetic scattering film; 200: Circuit device; and 201: Signal circuit.

DETAILED DESCRIPTION OF THE EMBODIMENTS

In order to make technical problems, technical solutions, and technical effects of the present disclosure clearer, the following, in detail, describes the technical solutions in the embodiments of the present disclosure with reference to the accompanying drawings in the embodiments of the present disclosure. Apparently, the described embodiments are some but not all of the embodiments of the present disclosure. Based on the embodiments in the present disclosure, all other embodiments obtained by those skilled in the art without creative work shall fall within the protection scope of the present disclosure.

Figure 1:
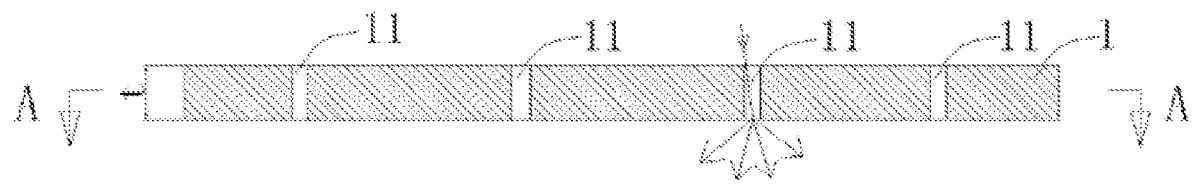
FIG. 1 is a schematic structural diagram of an electromagnetic scattering film according to an embodiment of the present disclosure.

FIG. 1 is a schematic structural diagram of an electromagnetic scattering film according to an embodiment of the present disclosure. As shown in FIG. 1, an electromagnetic scattering film provided by the embodiment of the present disclosure includes a metal layer 1. The metal layer 1 is provided with through holes 11 penetrating through an upper surface and a lower surface of the metal layer. The maximum value of a distance s between any two points on a contour of a section of each of the through holes 11 is less than a wavelength $\lambda$ of a microwave emitted into the through hole 11, such that the microwave is diffracted after being emitted into the through hole 11. In the technical field of communication, an important means for realizing data exchange is signal transmission, and microwave signal transmission is one of the means. Since a microwave signal is linearly transmitted in a specified direction, the microwave signal may not be received in a region that is not in the specified direction, or the microwave signal cannot be transmitted to a region outside the specified direction, resulting in communication failure. An arrow direction shown in FIG. 1 is an exemplary microwave transmission direction. The scattering film provided by the embodiment of the present disclosure adopts a diffraction principle. By providing, on the metal layer 1, the through hole 11 being far less than a wavelength of a microwave, when the microwave is emitted to pass through the through hole 11, diffraction may occur, so that a motion path of the microwave that is originally and directionally transmitted only is changed. Transmission paths in a plurality of directions are generated through diffraction, so as to expand a microwave transmission and/or receiving space range. The section described in the present disclosure refers to a section of the through hole 11 that is obtained by intercepting the scattering film in an A-A direction shown in FIG. 1.

Figure 3:
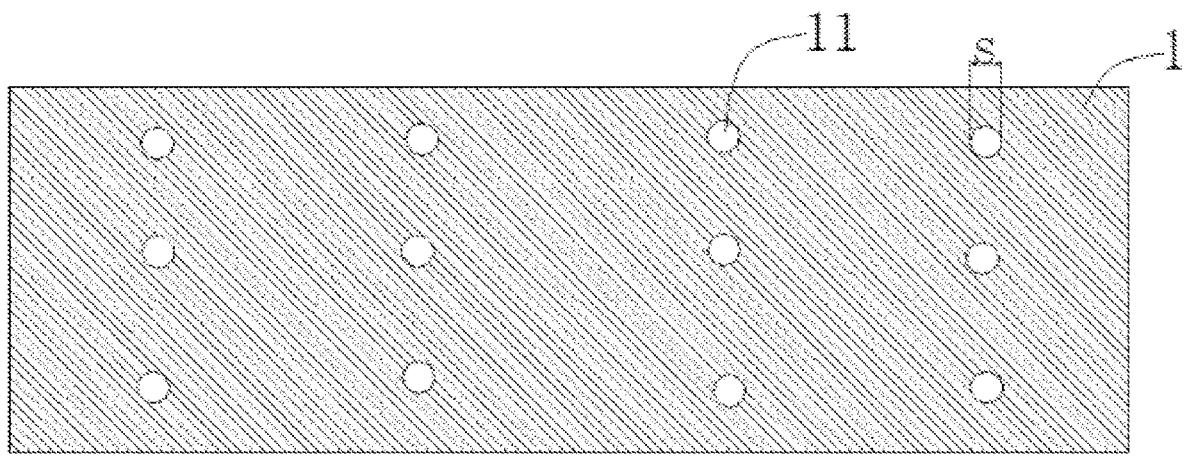
FIG. 3 is a schematic cross-sectional view of an electromagnetic scattering film with a circular hole according to an embodiment of the present disclosure (in an A-A direction in FIG. 1).
Figure 4:
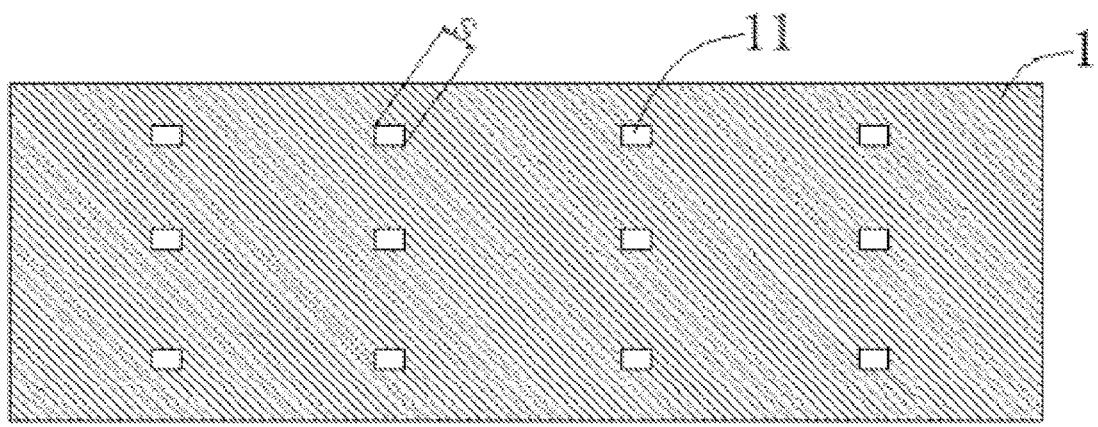
FIG. 4 is a schematic cross-sectional view of an electromagnetic scattering film with a square hole according to an embodiment of the present disclosure.
Figure 5:
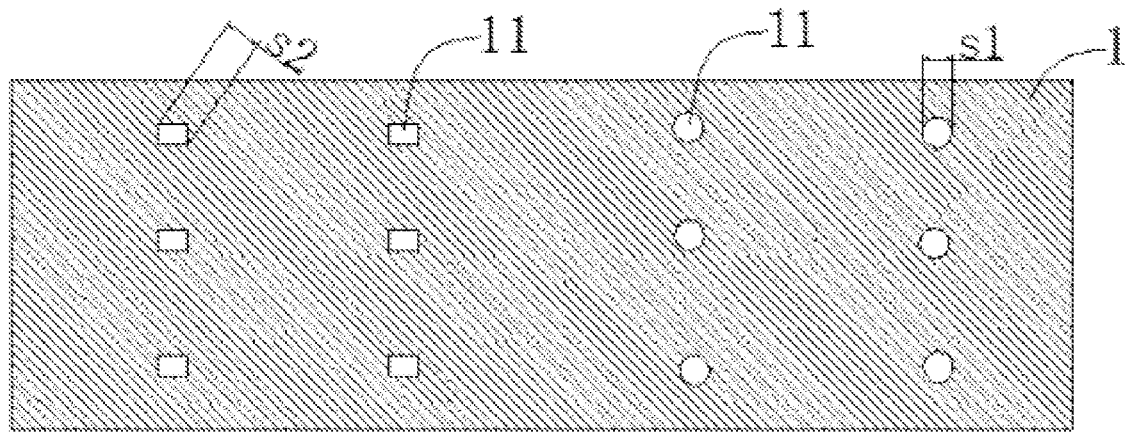
FIG. 5 is a schematic cross-sectional view of an electromagnetic scattering film with a combined hole type according to an embodiment of the present disclosure.

FIG. 3 to FIG. 5 are schematic cross-sectional views of an electromagnetic scattering film according to an embodiment of the present disclosure. The through hole 11 according to the embodiment of the present disclosure may be one or a combination of two or more than two of a circular hole or a non-circular hole. For example, the through hole 11 may be polygonal holes, such as a triangular hole and a quadrilateral hole or other irregular shaped holes, as long as satisfying a requirement that a microwave is diffracted after being emitted into the through hole 11.

Figure 2:
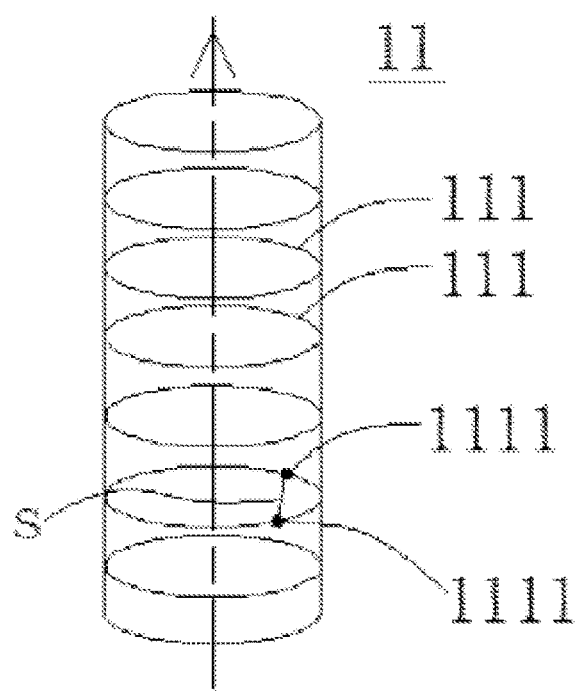
FIG. 2 is a schematic structural diagram of a through hole of an electromagnetic scattering film according to an embodiment of the present disclosure.

In this embodiment of the present disclosure, a plurality of points are formed on a contour of a section of the through hole 11. There is a linear distance between any two points. In an implementation, as shown in FIG. 2, a circular hole is taken as an example. In a direction of a center axis of the through hole 11, the through hole 11 has a plurality of sections 111 parallel to each other. The contour of each section has a plurality of points 1111 spaced apart from each other. There is the linear distance between two points 1111. In the present disclosure, by limiting the maximum value of a distance s between any two points on the contour of the section of the through hole 11 to be less than a wavelength $\lambda$ of a microwave emitted into the through hole 11, a size of the through hole 11 is limited to be less than the wavelength $\lambda$ of the microwave emitted into the through hole 11, so as to guarantee the diffraction of the microwave emitted into the through hole 11. As shown in FIG. 3, a view in an A-A direction in the figure, when the through hole 11 is a circular hole, the maximum value of the distance s between any two points on the contour of the section of the through hole 11 is a diameter of the through hole 11. In an embodiment shown in FIG. 3, the diameter of the through hole 11 is less than the wavelength $\lambda$ of the microwave emitted into the through hole 11. Through such a design, the size of the circular through hole 11 may be guaranteed to be less than the wavelength $\lambda$ of the microwave emitted into the through hole 11. As shown in FIG. 4, when the through hole 11 is a non-circular hole, for example, the through hole 11 shown in the figure is in a rectangular shape, the maximum value of the distance s between any two points on the contour of the section of the through hole 11 is a diagonal length of a rectangle.

In an embodiment shown in FIG. 4, the diagonal length of the through hole 11 is less than the wavelength $\lambda$ of the microwave emitted into the through hole 11. Through such a design, the size of the rectangular through hole 11 may be guaranteed to be less than the wavelength $\lambda$ of the microwave emitted into the through hole 11. As shown in FIG. 5, when the through hole 11 is a combination of the circular hole and the non-circular hole, the maximum value of the distance s between any two points on the contour of the section of the through hole 11 is the greater value of the diameter s1 of the circular through hole 11 or the diagonal length s2 of the rectangular through hole 11. In an embodiment shown in FIG. 5, the greater value of the diameter s1 of the circular through hole 11 or the diagonal length s2 of the rectangular through hole 11 is less than the wavelength $\lambda$ of the microwave emitted into the through hole 11. Through such a design, the size of the through hole 11 may be guaranteed to be less than the wavelength $\lambda$ of the microwave emitted into the through hole 11.

In an embodiment, the distance s between any two points on the contour of the section of the through hole 11 is in a range of 1 μm to 500 μm, and the distance s is less than the wavelength $\lambda$ of the microwave. It is to be noted that, the microwave in this embodiment carries a signal for microwave communication according to actual use requirement. In this embodiment, the wavelength $\lambda$ of the microwave is in a range of 0.1 mm to 1 m. In view of the value ranges of the above distance s and the wavelength $\lambda$ the size of the through hole 11 is far less than the wavelength of the microwave, such that the microwave is diffracted after being emitted into the through hole 11.

In an embodiment, a ratio of the distance s between any two points on the contour of the section of the through hole 11 to the wavelength $\lambda$ of the microwave is 1:200 to 1:100. By determining a size relationship between the distance s between any two points on the contour of the section of the through hole 11 and the wavelength $\lambda$ of the microwave, the distance s between any two points on the contour of the section of the through hole 11 is guaranteed to be far less than the wavelength $\lambda$ of the microwave, so that the microwave is guaranteed to be diffracted no matter which direction the microwave is emitted from. In this way, the microwave is ensured to be transmitted from directional transmission to multi-directional divergent transmission, so that a user may receive the signal in area in different directions.

In addition, in this embodiment of the present disclosure, the quantity of the through hole 11 disposed on the metal layer 1 per $cm^2$ is more than 1000. By providing the through holes 11 as much as possible, an effective contact area of the microwave and the electromagnetic scattering film may be increased, so as to scatter the microwave as much as possible. In an implementation, the opening ratio of the metal layer 1 is in a range of 1% to 99%. The opening ratio of the metal layer 1 is a ratio of a total area (the sum of areas of all openings) of the openings in the metal layer 1 to a main area of the metal layer 1, which is in the range of 1% to 99%. In an implementation, by taking any surface of the metal layer 1 as an example, the opening ratio refers to the ratio of the sum of areas of all holes provided on the surface to a superficial area of the metal layer 1. Through such a design, opening areas on the metal layer 1 can be controlled, so that the easy fracturing of the metal layer 1 caused by excessive large opening areas can be avoided.

Alternatively, a problem that a large number of microwaves are directly reflected by the metal layer 1 without being diffracted by means of the through hole 11 due to excessive small opening area can be avoided as well.

In this embodiment of the present disclosure, the plurality of through holes 11 are regularly or irregularly distributed on the metal layer 1; and/or the plurality of through holes 11 are in a same shape or different shapes; and/or the plurality of through holes 11 has a same size or different sizes. The through holes 11 are regularly distributed on the metal layer 1, that is to say, the through holes 11 are uniformly distributed on the metal layer 1. The through holes 11 are irregularly distributed on the metal layer 1, that is to say, the through holes 11 are disorderly distributed on the metal layer 1.

In this embodiment of the present disclosure, a thickness t of the metal layer 1 is in a range of 0.1 μm to 10 μm. Through such a design, the metal layer 1 is uneasy to fracture and has good flexibility. In an implementation, the metal layer 1 is made of one or more materials of copper, aluminum, titanium, zinc, iron, nickel, chromium, cobalt, silver and gold.

Figure 6:
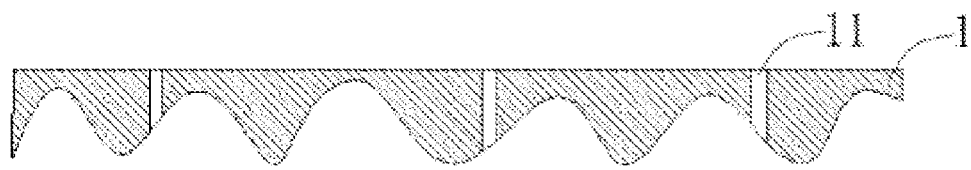
FIG. 6 is a schematic structural diagram of a metal layer of an electromagnetic scattering film according to an embodiment of the present disclosure.
Figure 7:
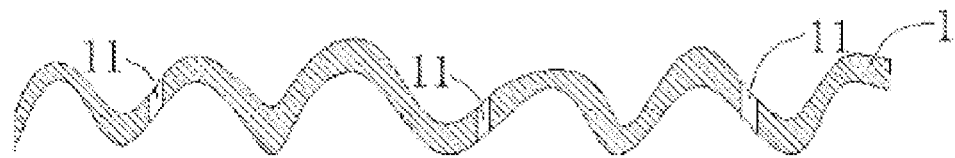
FIG. 7 is a schematic structural diagram of a metal layer of an electromagnetic scattering film according to another embodiment of the present disclosure.

In this embodiment, two surfaces of the metal layer 1 may be flat surfaces, or may also be non-flat surfaces. The non-flat surfaces include regular non-flat surfaces and irregular non-flat surfaces. When the surface of the metal layer 1 is the regular non-flat surface, the regular non-flat surface is a structure with periodic fluctuation, and fluctuation amplitudes and fluctuation intervals are the same. When the surface of the metal layer 1 is the irregular non-flat surface, the irregular non-flat surface is a structure with aperiodic fluctuation, and the fluctuation amplitudes and/or the fluctuation intervals are different. In an embodiment e of FIG. 1, the two surfaces of the metal layer 1 are flat surfaces. In an embodiment of FIG. 6, one surface of the metal layer 1 is the flat surface, and the other surface of the metal layer is the irregular non-flat surface. In an embodiment of FIG. 7, both surfaces of the metal layer 1 are the irregular non-flat surfaces.

Figure 8:
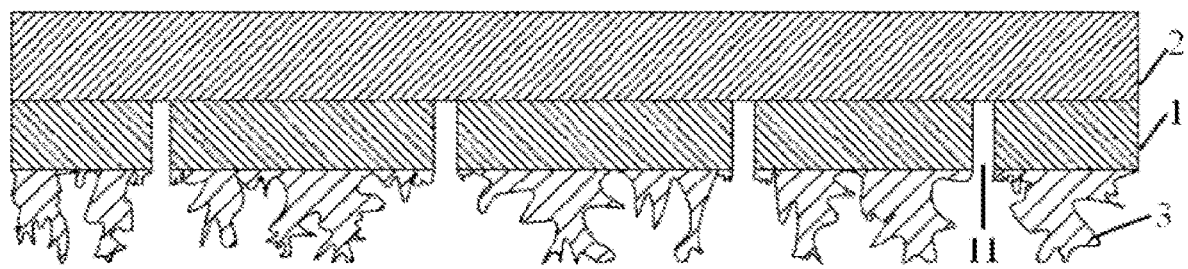
FIG. 8 is a schematic structural diagram of an electromagnetic scattering film according to an embodiment of the present disclosure.

FIG. 8 is a schematic structural diagram of an electromagnetic scattering film according to an embodiment of the present disclosure. As shown in FIG. 8, an insulation layer 2 is disposed on a side of the metal layer 1, and is configured to achieve insulation of the metal layer 1 and prevent short circuit with surrounding circuits. The insulation layer 2 may be an insulation film layer disposed on the surface of the metal layer 1, or an insulation coating coated on the surface of the metal layer 1. In this embodiment of the present disclosure, the insulation layer 2 has insulation and protection effects, so that the metal layer 1 is guaranteed to not be scratched and damaged during using. For example, a thickness of the insulation layer 2 is in a range of 1 μm to 25 μm. The insulation layer 2 includes any one of a PPS thin film layer, a PEN thin film layer, a polyester film layer, a polyimide film layer, a film layer formed after epoxy ink is cured, a film layer formed after polyurethane ink is cured, a film layer formed after modified acrylic resin is cured, and a film layer formed after polyimide resin is cured.

Figure 9:
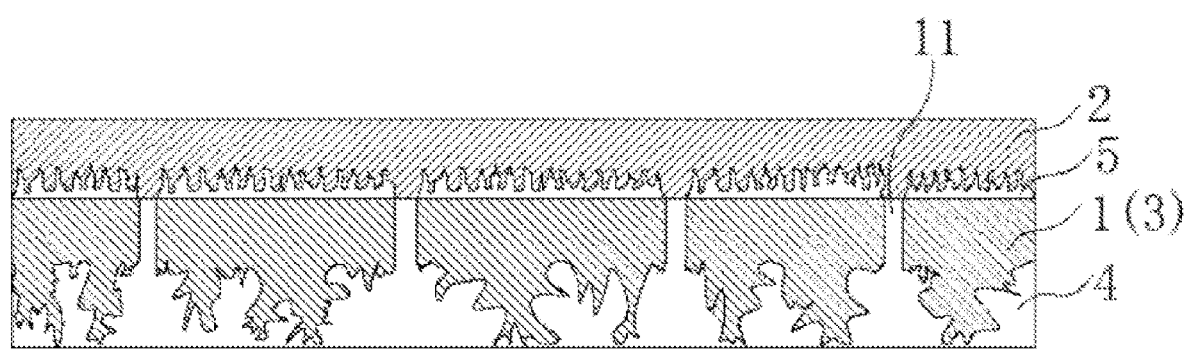
FIG. 9 is a schematic structural diagram of an electromagnetic scattering film according to another embodiment of the present disclosure.

Referring to FIG. 9, in order to improve the stability of connection between the insulation layer 2 and the metal layer 1, so as to avoid the insulation layer 2 and the metal layer 1 from stripping, in this embodiment, a plurality of protruding portions 5 are disposed on a side, close to the insulation layer 2, of the metal layer 1. The protruding portions 5 extend into the insulation layer 2. In addition, each protruding portion 5 may be protruded in a direction from the metal layer 1 to the insulation layer 2, or may also be protruded in a direction from the insulation layer 2 to the metal layer 1, as long as satisfy a requirement for improving the stability of connection between the insulation layer 2 and the metal layer 1. It is to be noted that, a shape of the protruding portion 5 in FIG. 9 is merely exemplary. Due to a difference between processes and parameters, each protruding portion 5 is in a regular or irregular solid geometric shape. For example, the protruding portion 5 may be in shapes of one or more of a pointed shape, an inverted cone shape, a granular shape, a dendritic shape, a columnar shape, and a block shape. In this embodiment of the present disclosure, the protruding portion 5 is not limited by drawings and the above shapes, as long as the protruding portion 5 facilitates to improve the stability of connection between the insulation layer 2 and the metal layer 1, it falls within the scope of protection of the present disclosure. The plurality of protruding portions 5 may be in a same shape or different shapes, and may also have a same size or different sizes. That is to say, the plurality of protruding portions 5 may be in shapes of one or more of a pointed shape, an inverted cone shape, a granular shape, a dendritic shape, a columnar shape, and a block shape. In addition, the sizes of the plurality of protruding portions 5 in the same shape may not be exactly the same. In addition, the plurality of protruding portions 5 are continuously or discontinuously distributed on the side, close to the insulation layer 2, of the metal layer 1. For example, when the plurality of protruding portions 5 are in the pointed shape and continuously distributed, regular and periodic dentate three-dimensional patterns or irregular and unordered dentate three-dimensional patterns may be formed. Definitely, only one of the above situations is listed herein. The above combinations of other shapes also fall within the scope of protection of the present disclosure, which are not listed one by one herein. In other embodiments of the present disclosure, the surface of the metal layer 1 is the non-flat surface, the stability and reliability of connection between the metal layer 1 and the insulation layer 2 are also improved.

In this embodiment of the present disclosure, the protruding portion 5 may be conductive or non-conductive. In an implementation, the protruding portion 5 includes one or more of metal particles, carbon nanotube particles, ferrite particles, insulator particles, and coated composite particles (conductor particles formed by a conductor layer as a coating layer, or another insulator particles coated by an insulator). When the protruding portion 5 is conductive, the protruding portion 5 includes one or more of the metal particles, the carbon nanotube particles, the ferrite particles, and the coated composite particles (the conductor particles formed by the conductor layer as the coating layer). When the protruding portion 5 is non-conductive, the protruding portion 5 includes one or more of the insulator particles and coated composite particles (another insulator particles coated by the insulator). In addition, when the protruding portion 5 adopts the metal particles, the protruding portion 5 includes single metal particles and/or alloy particles. The single metal particles are made of any one of copper, aluminum, titanium, zinc, iron, nickel, chromium, cobalt, silver and gold. The alloy particles are made of any two or more than two of the copper, the aluminum, the titanium, the zinc, the iron, the nickel, the chromium, the cobalt, the silver and the gold. It is to be noted that, the plurality of protruding portions 5 and the metal layer 1 may adopt a same material or different materials.

In addition, during implementation, when the protruding portions 5 are conductive, the metal layer 1 may be formed firstly, then the protruding portions 5 are formed on the metal layer 1 through other process, and finally, the insulation layer 2 is formed on a side, provided with the protruding portions 5, of the metal layer 1. Definitely, the metal layer 1 and the protruding portions 5 may also be integrally formed. For example, a height of each protruding portion 5 is in a range of 0.1 μm to 15 μm. When the protruding portion 5 is conductive, the height of the protruding portion 5 is less than a thickness of the insulation layer 2, so as to prevent failure of the insulation layer 2.

In an example of FIG. 8, conductive protrusions 3 are disposed on the surface of the metal layer 1, so that when the electromagnetic scattering film is used, interference charges accumulated in the metal layer 1 are derived, thereby avoiding the interference charges from accumulating to form an interference source. A plurality of conductive protrusions 3 are disposed on a side surface, away from the insulation layer 2, of the metal layer 1. In the embodiment of FIG. 8, the metal layer 1 is firstly formed, and then, the conductive protrusions 3 are formed on the metal layer 1 through other processes. In an embodiment of FIG. 9, the metal layer 1 and the conductive protrusions 3 are integrally formed. It is to be noted that, shapes of the conductive protrusions 3 in the figure are merely exemplary. Due to a difference between processes and parameters, each conductive protrusion 3 is in a regular or irregular solid geometric shape. For example, the plurality of conductive protrusions 3 may be in shapes of one or more of a pointed shape, an inverted cone shape, a granular shape, a dendritic shape, a columnar shape, and a block shape.

In addition, for the plurality of conductive protrusions 3 disposed on the side, away from the insulation layer 2, of the metal layer 1, the conductive protrusions 3 may be in a same shape or different shapes, and may also have a same size or different sizes. That is to say, the plurality of conductive protrusions 3 may be in shapes of one or more of the pointed shape, the inverted cone shape, the granular shape, the dendritic shape, the columnar shape, and the block shape. And the sizes of the plurality of conductive protrusions 3 in the same shape may not be exactly the same. In addition, the plurality of conductive protrusions 3 are continuously or discontinuously distributed on the side, away from the insulation layer 2, of the metal layer 1. For example, when the plurality of conductive protrusions 3 are in the pointed shape and continuously distributed, regular and periodic dentate three-dimensional patterns or irregular and unordered dentate three-dimensional patterns may be formed. Definitely, only one of the above situations is listed herein. The above combinations of other shapes also fall within the scope of protection of the present disclosure, which are not listed one by one herein.

In this embodiment of the present disclosure, the conductive protrusions 3 include one or more of metal particles, carbon nanotube particles, and ferrite particles. The conductive protrusions 3 include single metal particles and/or alloy particles. The single metal particles are made of any one of copper, aluminum, titanium, zinc, iron, nickel, chromium, cobalt, silver and gold. The alloy particles are made of any two or more than two of the copper, the aluminum, the titanium, the zinc, the iron, the nickel, the chromium, the cobalt, the silver and the gold. It is to be noted that, the conductive protrusions 3 and the metal layer 1 may adopt a same material or different materials.

In this embodiment of the present disclosure, on the premise of achieving a grounding effect, a product is made as light and thin as possible. A height h of each conductive protrusion 3 is in a range of 0.1 to 30 μm.

As shown in FIG. 9, for convenient use of the electromagnetic scattering film, in this embodiment, an adhesive film layer 4 is disposed on the side, away from the insulation layer 2, of the metal layer 1. The plurality of conductive protrusions 3 extend into the adhesive film layer 4. The conductive protrusions 3 may form certain distance from an outer surface of the adhesive film layer 4, and may also be in contact with the outer surface of the adhesive film layer 4 or extend out of the outer surface of the adhesive film layer 4. The outer surface of the adhesive film layer 4 may be a flat surface without fluctuation, or may also be a non-flat surface with gentle fluctuation. During using, the plurality of conductive protrusions 3 penetrate the adhesive film layer 4 and are grounded, so as to derive the interference charges accumulated in the metal layer 1. In other embodiments of the present disclosure, the surface of the metal layer 1 is the non-flat surface, so that a non-flat concave-convex surface may be formed on the surface of the metal layer 1. Through such a design, more adhesive is connected to the metal layer 1, thereby enhancing the stability and reliability of connection between the metal layer 1 and the adhesive film layer 4.

In an implementation, materials used by the adhesive film layer 4 are selected from any one of modified epoxy resin, acrylic acid, modified rubber, modified thermoplastic polyimides, polyurethane, polyacrylates, and organosilicon.

In this embodiment of the present disclosure, the height of each conductive protrusion 3 may be in a range of 0.1 μm to 30 μm. A thickness of the adhesive film layer 4 may be in a range of 0.1 μm to 45 μm. By designing the height of the conductive protrusion 3 to be in the range of 0.1 μm to 30 μm and the thickness of the adhesive film layer 4 to be in the range of 0.1 μm to 45 μm, when the electromagnetic scattering film is used, the conductive protrusion 3 can penetrate the adhesive film layer 4, thereby achieving the grounding of the electromagnetic scattering film.

Figure 10:
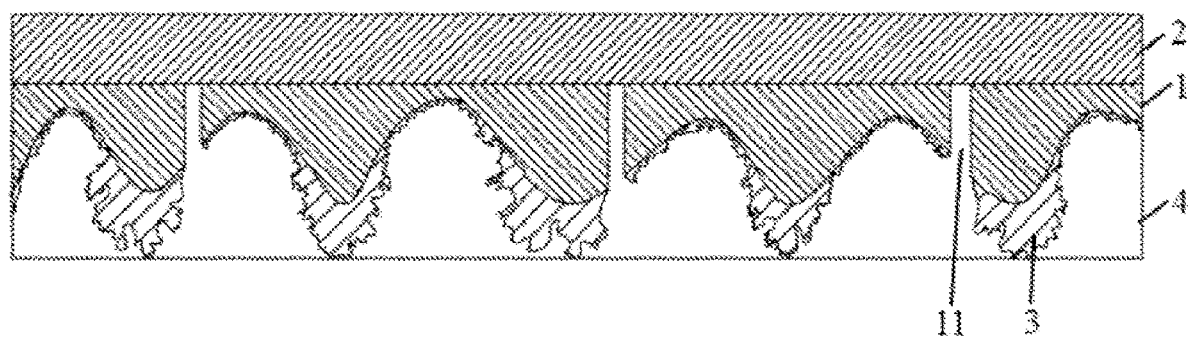
FIG. 10 is a schematic structural diagram of an electromagnetic scattering film according to an embodiment of the present disclosure (a surface of a metal layer that is away from an insulation layer is a not-flat surface).
Figure 11:
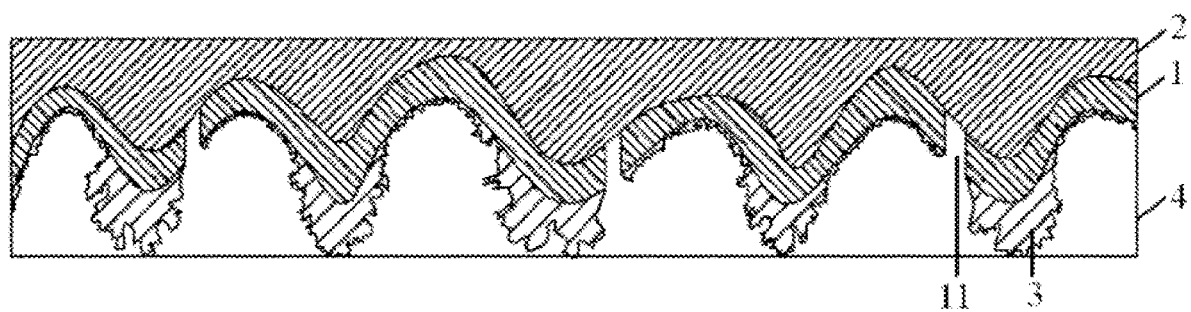
FIG. 11 is a schematic structural diagram of an electromagnetic scattering film according to an embodiment of the present disclosure (both upper and lower surfaces of a metal layer are not-flat surfaces).

As shown in FIGS. 10-11, one surface of the metal layer 1 in the electromagnetic scattering film shown in FIG. 10 is a flat surface, and the other surface of the metal layer is an irregular non-flat surface. A surface of the adhesive film layer 4 connected to the metal layer 1 is also presented as the irregular non-flat surface. Both surfaces of the metal layer 1 in the electromagnetic scattering film shown in FIG. 11 are the irregular non-flat surfaces. Surfaces of the insulation layer 2 and the adhesive film layer 4 connected to the metal layer 1 are also presented as the irregular non-flat surfaces. Through such a design, the surface of the metal layer 1 is the irregular non-flat surface, so that the stability and reliability of connection between the insulation layer 2 and the adhesive film layer 4 may be enhanced.

For adapting of more application scenarios, the electromagnetic scattering film described in the present disclosure is in a flexible, foldable and bendable structure. In an implementation, the metal layer 1 may adopt a flexible structure, such as a metal circuit board and an FPC circuit board. The adhesive film layer 4 for connection and disposed on one surface of the metal layer 1 is foldable. The insulation layer 2 for protection and disposed on the other surface of the metal layer 1 is bendable. Thus, the electromagnetic scattering film in the present disclosure is foldable and bendable. During actual use, the scattering film may be bent or folded into an annular structure, a semi-closed structure and other shapes, such as an arc-shaped structure, an oval structure, and a stack structure, according to needs.

Figure 12:
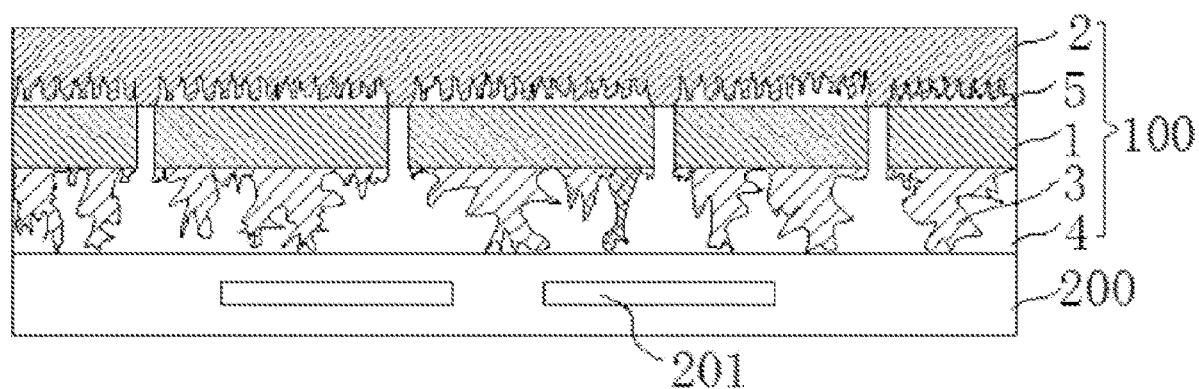
FIG. 12 is a schematic structural diagram of an electronic device according to an embodiment of the present disclosure.

FIG. 12 is a schematic structural diagram of an electronic device according to an embodiment of the present disclosure. As shown in FIG. 12, an electronic device includes an electromagnetic scattering film 100 and a circuit device 200. The circuit device 200 includes a signal circuit 201. The electromagnetic scattering film 100 is connected to the circuit device 200. In this embodiment, the circuit device 200 is connected to the adhesive film layer 4 of the electromagnetic scattering film 100. In other examples, the circuit device 200 may include a bonding layer itself, so that the electromagnetic scattering film may also realize an objective of the present disclosure without disposing the adhesive film layer 4.

Based on the above, in the electronic device provided by an embodiment of the present disclosure, the electromagnetic scattering film is connected to the circuit device. A microwave signal, emitted and/or received by the signal circuit, is diffracted by using the through hole 11 of the electromagnetic scattering film, thereby expanding a microwave signal transmission and/or receiving space range of the electronic device. In this way, a signal blind zone of the electronic device is avoided, and the usage experience of a user is improved.

It is to be noted that, the above is merely part of the embodiments and the used technical principles of the present disclosure.

What is claimed is:

1. An electromagnetic scattering film, comprising a metal layer, wherein the metal layer is provided with a through hole penetrating through an upper surface and a lower surface of the metal layer, a maximum value of a distance s between any two points on a contour of a section of the through hole is less than a wavelength λ of a microwave emitted into the through hole, so as to cause the microwave to be diffracted after being emitted into the through hole, wherein a ratio of the distance s between any two points on the contour of the section of the through hole to the wavelength λ of the microwave is 1:200-1:100.

2. The electromagnetic scattering film as claimed in claim 1, wherein the distance s between any two points on the contour of the section of the through hole is in a range of 1 μm to 500 μm, and is less than the wavelength λ of the microwave.

3. The electromagnetic scattering film as claimed in claim 1, wherein a quantity of the through hole disposed on the metal layer per $cm^2$ is more than 1000.

4. The electromagnetic scattering film as claimed in claim 3, wherein an opening ratio of the metal layer is in a range of 1% to 99%.

5. The electromagnetic scattering film as claimed in claim 1, wherein a thickness t of the metal layer is in a range of 0.1 μm to 10 μm.

6. The electromagnetic scattering film as claimed in claim 1, wherein an insulation layer is disposed on a side of the metal layer.

7. The electromagnetic scattering film as claimed in claim 6, wherein the insulation layer is an insulation film layer disposed on a surface of the metal layer or an insulation coating coated on a surface of the metal layer.

8. The electromagnetic scattering film as claimed in claim 6, wherein a plurality of protruding portions are disposed on a side, close to the insulation layer, of the metal layer, and extend into the insulation layer.

9. The electromagnetic scattering film as claimed in claim 1, wherein a conductive protrusion is disposed on a surface of the metal layer.

10. The electromagnetic scattering film as claimed in claim 9, wherein a height h of the conductive protrusion is in a range of 0.1 μm to 30 μm.

11. The electromagnetic scattering film as claimed in claim 10, wherein an adhesive film layer is disposed on the surface, on a same side with the conductive protrusion, of the metal layer, and the conductive protrusion extends into the adhesive film layer.

12. The electromagnetic scattering film as claimed in claim 9, wherein the conductive protrusion is one or a combination of shapes of a pointed shape, an inverted cone shape, a granular shape, a dendritic shape, a columnar shape, and a block shape.

13. The electromagnetic scattering film as claimed in claim 1, wherein a surface of the metal layer is a non-flat surface.

14. The electromagnetic scattering film as claimed in claim 1, wherein the electromagnetic scattering film is in a bendable structure.

15. An electronic device, comprising the electromagnetic scattering film of claim 1, wherein the electronic device further comprises a circuit device, the circuit device comprises a signal circuit, and the electromagnetic scattering film is connected with the circuit device.

* * * * *